(12) United States Patent
Buskirk et al.

(10) Patent No.: US 7,884,493 B2
(45) Date of Patent: Feb. 8, 2011

(54) WIND TURBINE GENERATOR BRAKE AND GROUNDING BRUSH ARRANGEMENT

(75) Inventors: Eric S. Buskirk, Guilderland, NY (US); Blake W. Wilson, Scotia, NY (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 12/241,507

(22) Filed: Sep. 30, 2008

(65) Prior Publication Data

US 2010/0079019 A1    Apr. 1, 2010

(51) Int. Cl.
*F03D 7/00* (2006.01)
*F03D 9/00* (2006.01)

(52) U.S. Cl. .............. 290/55; 290/44; 415/4.2

(58) Field of Classification Search ............ 290/54, 290/55, 43, 44; 415/4.2, 4.3
See application file for complete search history.

(56) References Cited

U.S. PATENT DOCUMENTS

| | | | |
|---|---|---|---|
| 6,285,090 B1 * | 9/2001 | Brutsaert et al. ............. 290/55 |
| 6,921,243 B2 * | 7/2005 | Canini et al. ............... 415/4.3 |
| 7,075,192 B2 * | 7/2006 | Bywaters et al. ............. 290/55 |
| 7,109,600 B1 * | 9/2006 | Bywaters et al. ............. 290/55 |
| 7,119,453 B2 * | 10/2006 | Bywaters et al. ............. 290/55 |
| 7,183,665 B2 * | 2/2007 | Bywaters et al. ............. 290/55 |
| 7,431,567 B1 * | 10/2008 | Bevington et al. ...... 416/244 R |
| 7,709,972 B2 * | 5/2010 | Arinaga et al. .............. 290/55 |
| 2003/0194310 A1 | 10/2003 | Canini et al. |

FOREIGN PATENT DOCUMENTS

DE    4402184 A1    8/1995
WO    2007125349 A2    11/2007

* cited by examiner

*Primary Examiner*—Nicholas Ponomarenko
(74) *Attorney, Agent, or Firm*—Edward J. Smith; Ernest G. Cusick; Frank A. Landgraff

(57) ABSTRACT

A disc brake arrangement is provided as adapted for a wind turbine generator incorporating a rotor shaft supporting a rotor wheel and support ring for a rotor structure surrounded by a stator structure within a generator casing. The disc brake arrangement includes a brake disc mounted normal to and concentric with the rotor shaft and operatively connected to the support ring. A plurality of disc brake calipers are arranged concentrically with the rotor shaft and adapted to engage the brake disc.

20 Claims, 6 Drawing Sheets

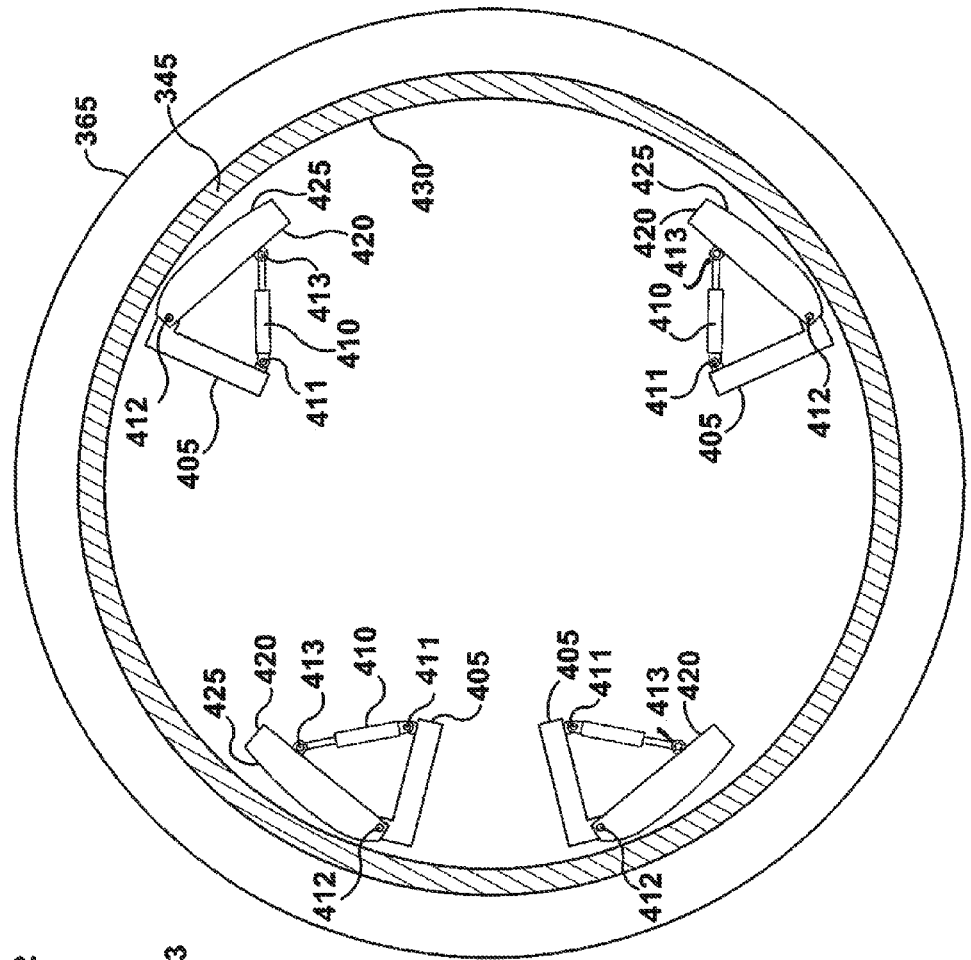
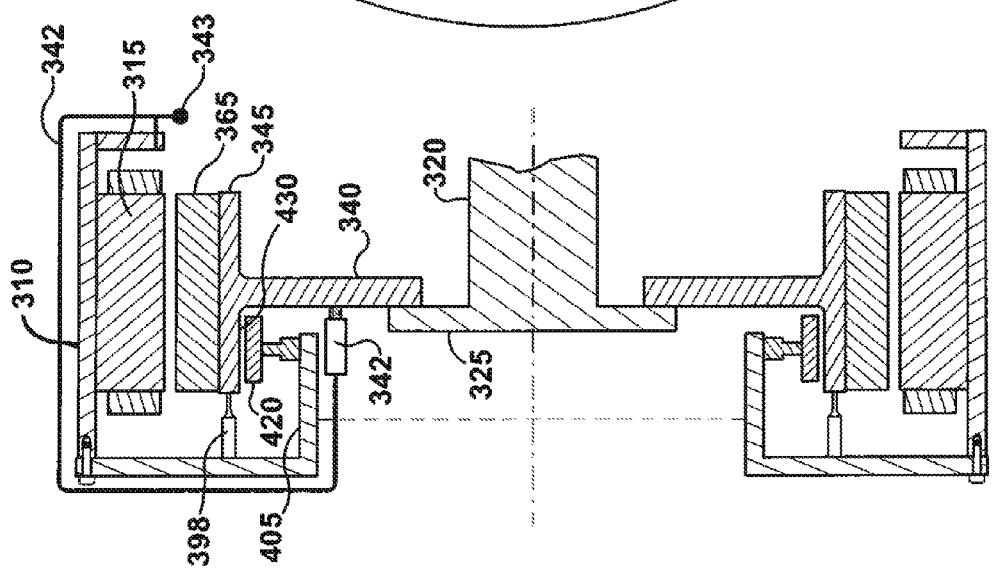

WIND TURBINE GENERATOR BRAKE AND GROUNDING BRUSH ARRANGEMENT

BACKGROUND OF THE INVENTION

The invention relates generally to a wind turbine generator and more specifically to a structure for reducing the size and weight of the brake for the wind turbine generator.

Generally, wind turbines use the wind to generate electricity. The wind turns multiple blades connected to a rotor. The spin of the blades caused by the wind spins a shaft of the rotor, which connects to a generator that generates electricity. Specifically, the rotor is mounted within a housing or nacelle, which is positioned on top of a truss or tubular tower, which may be as high as about 100 meters. Utility grade wind turbines (e.g., wind turbines designed to provide electrical power to a utility grid) can have large rotors (e.g., 50 or more meters in diameter). Blades on these rotors transform wind energy into a rotational torque or force that drives one or more generators, rotationally coupled to the rotor through a gearbox. The gearbox may be used to step up the inherently low rotational speed of the turbine rotor for the generator to efficiently convert mechanical energy to electrical energy, which is provided to a utility grid. Various types of electrical generators may be used in these wind turbines.

To accommodate the need for greater power from windfarms, individual wind turbine generators are increasingly being provided with higher power output capability. In general, to accommodate a higher power output, the power generating equipment including electrical generator, gearbox and controls become larger and heavier. However, due to the location of in the nacelle at the top of a tall, thin tower, limiting the weight and size for the power generating equipment such as the wind turbine generator and the gearbox becomes critical.

FIG. 1 illustrates a prior art power train 105 for a wind turbine 100 within nacelle 185 atop tower 190. Rotor hub 110 is driven by the wind turbine blades (not shown) to turn wind turbine rotor shaft 175 supported by main bearing 125. Gearbox 160 is tied to drive wind turbine generator 150 through coupling 165.

A braking mechanism typically is provided for the wind turbine generator (WTG). The braking mechanism may be used to stop the rotor from spinning and to hold the rotor after it has been stopped. Often the brake for the WTG is a disctype brake.

FIG. 2 illustrates a simplified arrangement for a typical prior art disc brake structure for a wind turbine generator. Multiple wind turbine blades 220 are attached to a rotor hub 210. A main shaft 230 from the hub 210 is tied to a gearbox 240. An output shaft 250 from the gearbox 240 drives the rotor shaft (internal) to wind turbine generator 260. Situated between the gearbox 240 and the wind turbine generator 260 on the gearbox output shaft 240 is a disc brake 270. The disc brake 270 includes a cylindrical brake disc 275 on the gearbox output shaft 250 and a brake calipers 280 (mounting not shown). Although only one brake caliper 280 is shown, a plurality of brake calipers may be mounted circumferentially around outer radial end surfaces 285 of the cylindrical brake disc 275.

The brake disc 275 may typically be about 0.8 m to 1.2 m in diameter, with a thickness of about 25 mm to 50 mm thick. The disc may weigh about 100 kg to 500 kg, a substantial weight considering the height the wind turbine tower from the ground. The weight of the brake disc 275 can be a significant load for bearing supports for the power train. Further, the positioning of the brake disc between the gearbox and the generator adds length to overall axial size of the power train. The positioning of the brake disc 275 adjacent to an end 255 of the wind turbine generator 260 may also restrict access to the internals (not shown) of the wind turbine generator 260. Such limits on access may make maintenance on the internals of the wind turbine generator 260 more difficult.

Accordingly, there is a need to provide a braking system within a WTG structure that reduces the size, weight and overall length of the power train, while at the same time providing enhanced access to the generator casing internals.

BRIEF DESCRIPTION OF THE INVENTION

An inventive arrangement is provided for a disc brake of a wind turbine generator.

Briefly in accordance with one aspect of the present invention, a disc brake arrangement is provided as adapted for a wind turbine generator incorporating a rotor shaft supporting a rotor wheel and support ring for a rotor winding surrounded by a stator winding within a generator casing. The disc brake arrangement includes a rotor shaft, a support ring, a brake disc mounted normal to and concentric with the rotor shaft and operatively connected to the support ring; and a plurality of disc brake calipers arranged concentrically with the rotor shaft and adapted to engage the brake disc.

In another aspect of the present invention, a method is provided, adapted for braking a wind turbine generator incorporating a rotor shaft supporting a rotor wheel and support ring for a rotor winding surrounded by a stator winding within a generator casing. The method includes mounting a brake disc normal to and concentric with the rotor shaft and operatively connecting to the support ring; and mounting a plurality of disc brake calipers arranged concentrically with the rotor shaft and adapted to engage the annular brake disc.

BRIEF DESCRIPTION OF THE DRAWING

These and other features, aspects, and advantages of the present invention will become better understood when the following detailed description is read with reference to the accompanying drawings in which like characters represent like pails throughout the drawings, wherein:

FIG. 6A illustrates a cutaway axial view of an embodiment for the inventive arrangement of a drum brake within the wind turbine generator; and FIG. 6B illustrates a cross section of the embodiment of the drum brake arrangement.

DETAILED DESCRIPTION OF THE INVENTION

The following embodiments of the present invention have many advantages, including providing a smaller and lighter brake disc for the wind turbine generator, thereby reducing the overall weight of the WTG power train at the top of the wind turbine tower. The serial aspect of mounting the typical brake disc structure between the WTG and the gearbox is eliminated, thereby providing an opportunity to shorten the length of the WTG power train. Elimination of the placement of the brake disc structure adjacent to the inboard end of the WTG also may afford enhanced access to the generator casing internals from the generator-side end, for ground brush servicing, as an example. Further, the inventive arrangement can increase rotor stiffness and can improve braking torque.

Figure 3:
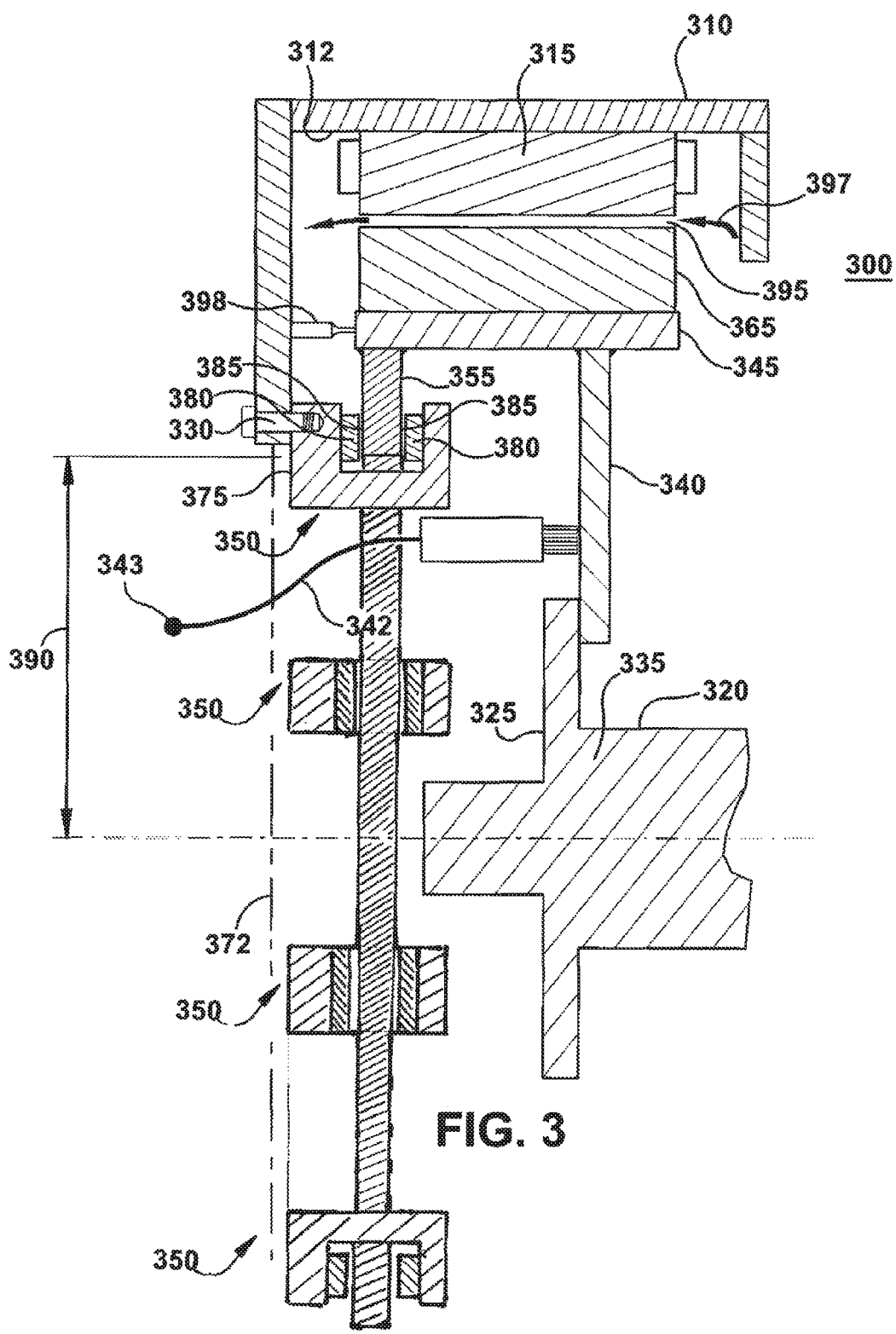
FIG. 3 illustrates an axial cross section view of an embodiment for an inventive structure for a disc brake arrangement within a wind turbine generator.

FIG. 3 illustrates an axial cross section view of an embodiment for an inventive structure for a disc brake 350 within a wind turbine generator. The WTG 300 includes a gearbox output shaft (also referred to as rotor shaft) 320 with a shaft disc 325 at the generator-side end 335. Attached radially around an outer circumferential part of the shaft disc 325 is support ring wheel 340 for support ring 345. At an outer radial end of the support ring wheel 340, the support ring 345 is circumferentially mounted circumferentially around the support ring wheel 340. Mounted to and circumferentially around the support ring 345 is a rotor structure 365. A stator structure 315 is mounted on an inner surface of a generator casing, separated from the rotor structure 365 by an air gap 395.

A brake disc 355 is mounted normal to and concentric with the rotor shaft 320, and operatively connected to a support ring 345. The brake disc 355 may form an annulus concentric with the rotor shaft 320. An outer radial end 360 of the brake disc 355 may be operatively connected to the support ring 345. The operative connection to the support ring 345 may be provided at an inner surface 347 of the support ring 345. The operative connection of the brake disc to the support ring may include one of a welded connection and a bolted connection.

Because the brake disc 355 is supported at an outer radial end 360 by the support ring, it may be formed as an annulus. Therefore, the brake disc 355 need not extend inward to the gearbox shaft 320 or shaft disc 325 for support, allowing a significant reduction in size and weight. Further, since the braking torque provided by the disc brake 355 is proportional to the radial distance R 390 from the rotor shaft 320 and it is desirable to provide a strong braking torque, the braking torque may be maximized by locating the braking surface at the maximum possible radial position with respect to the rotor shaft. Since the outer end of the brake disc may be mounted to the inner surface of the support ring, locating the braking surface close in proximity to the support ring will maximize the braking torque (all other factors being held constant). Consequently, the large braking diameter may allow the use of smaller brake calipers or a fewer number of brake calipers.

A plurality of brake calipers 375 may be provided arranged concentrically with the rotor shaft and adapted to engage the brake disc 355. The individual brake caliper 375 may be mounted with an open end directed outward radially so as to position the brake pads 380 to engage the braking surface 385 of the brake disc 355. The plurality of brake calipers 375 may be disposed with equal spacing circumferentially around the brake disc 355. The disc brake caliper 375 may be mounted to and supported by the wall 370 of the generator casing 310 on the generator-side with bolts 330 or other known mechanical means.

Figure 4A:
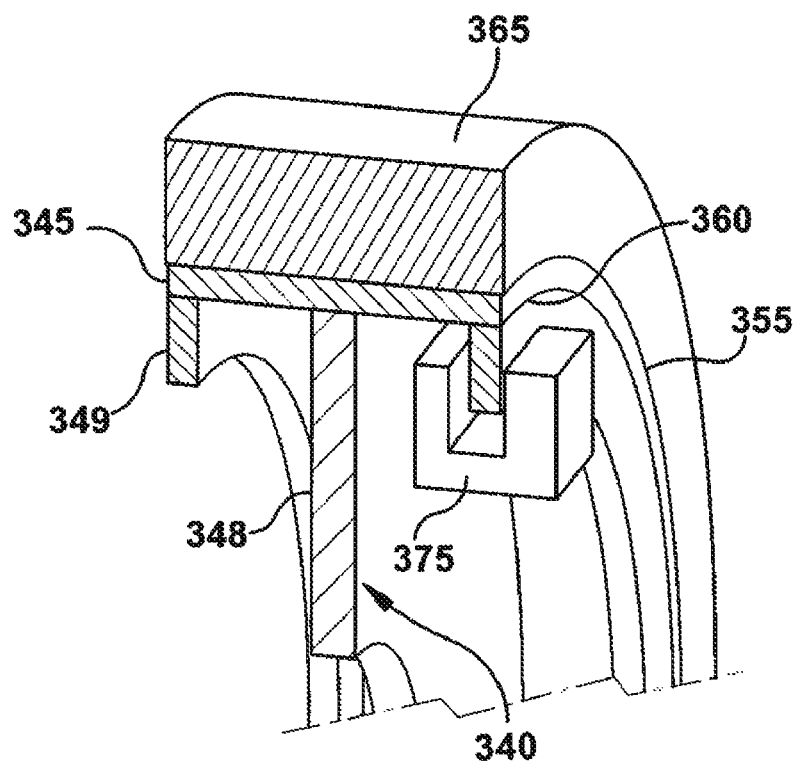
FIG. 4A illustrates one embodiment of a disc brake arrangement including a centered arm for a support ring.
Figure 4B:
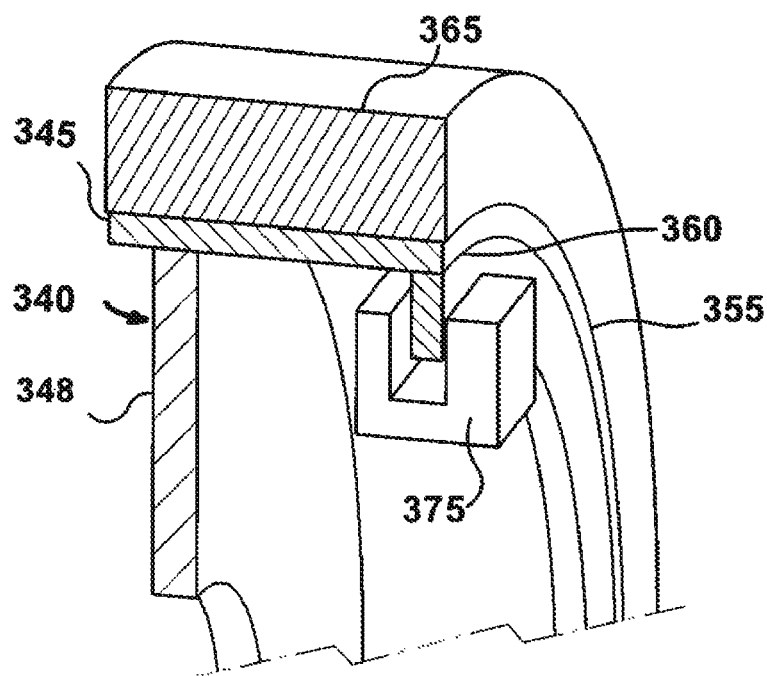
FIG. 4B illustrates a second embodiment of a disc brake arrangement including an eccentric arrangement for a support ring.

FIG. 4A illustrates a cutaway view for one embodiment of a disc brake arrangement including a centered support ring wheel 348 for a support ring 345. The support ring wheel 348 of the support ring 345 is centered on the support ring arm 346. Stiffener 349 may be added to the support ring 345 to add strength and balance to the support ring 345 in recognition of the force and weight imposed on it by brake disc FIG. 4B illustrates a cutaway view for a second embodiment of a disc brake arrangement including an eccentric arrangement for a support arm with respect to the support ring art. Eccentric placement of the support ring wheel 348 with respect to the support ring arm 346 better balances the support ring arm 345 with the brake disc 355 appended at an outer axial end of the support ring arm 346.

Figure 1:
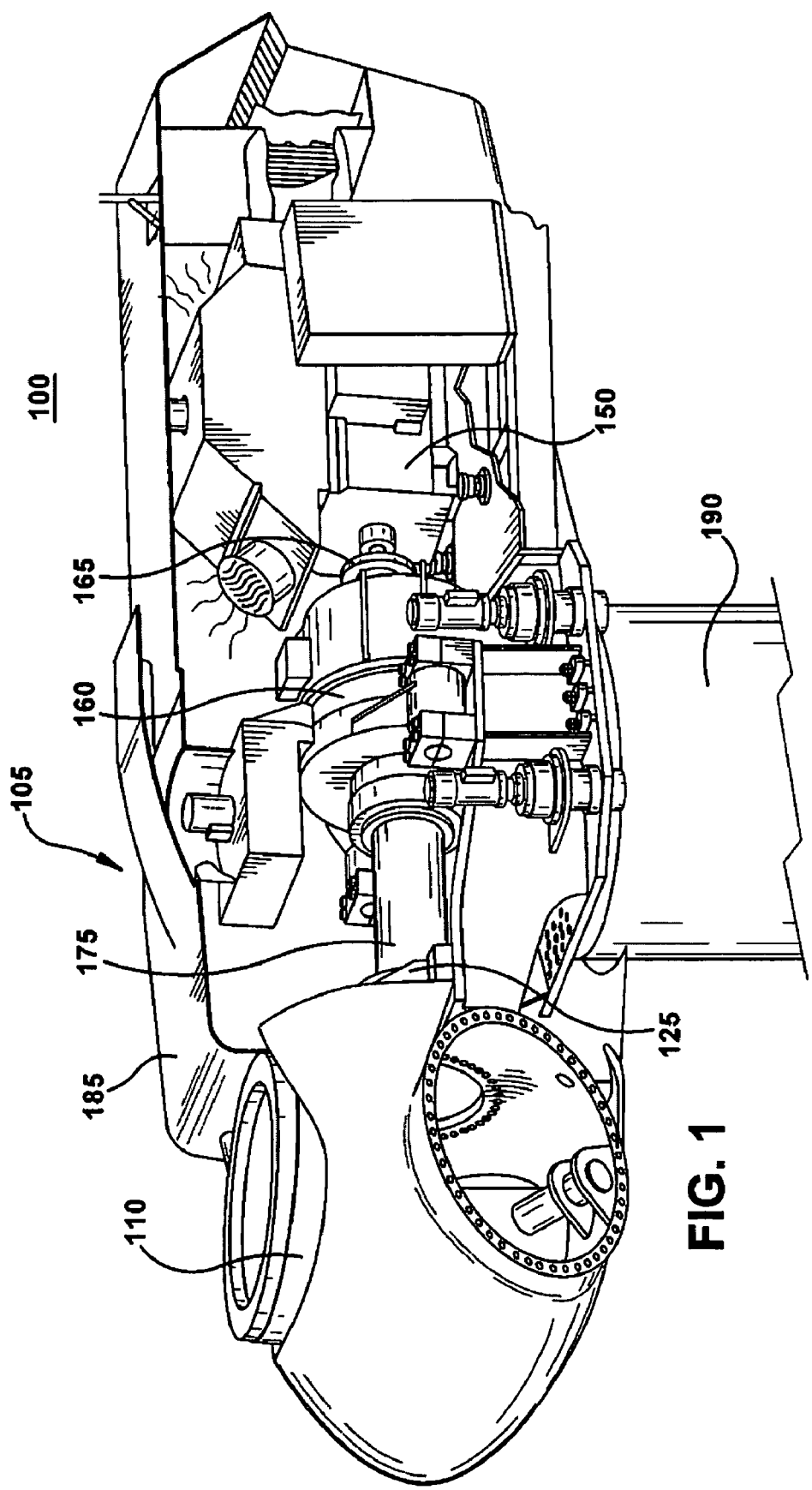
FIG. 1 illustrates a typical power train for a wind turbine generator within nacelle.
Figure 2:
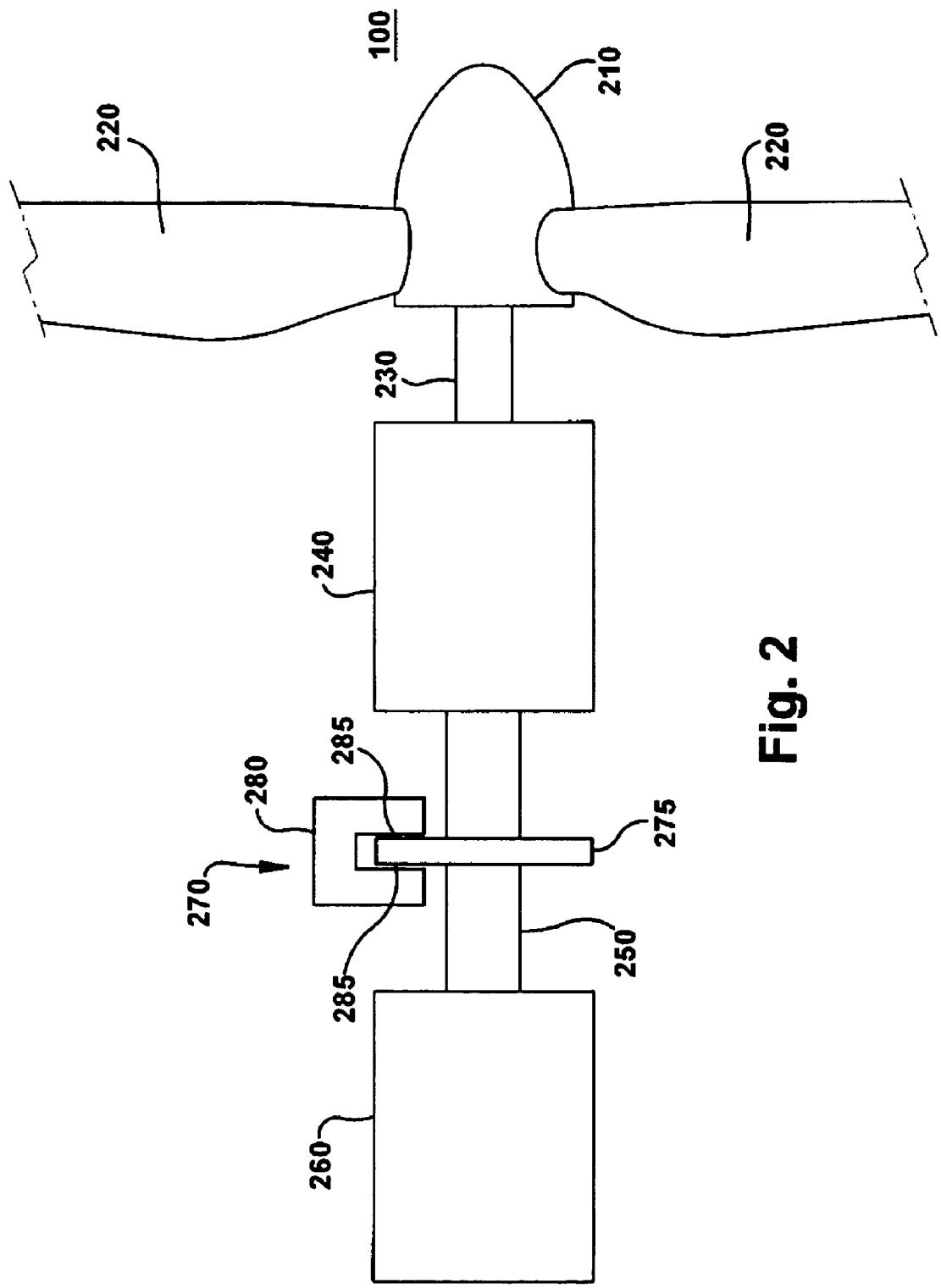
FIG. 2 illustrates a simplified arrangement for typical a disc brake structure for a wind turbine generator.

Refer again to FIG. 3. Elimination of the prior art disc brake between the WTG 300 and the gearbox (FIG. 2) eliminates a large structure at the generator-side end of the WTG casing and opens up greater access to structures internal to the WTG casing at this end. In particular, greater access may be provided to a ground brush 341 engaging the rotating rotor wheel 340 and further electrically connected by grounding wire 342 to a ground point 343 external to the generator casing 310. The greater access may facilitate servicing of the ground brush 341 by removing guard 372. In one aspect of the present invention, the grounding brush 341 may be provided with an electrically insulated mounting 344 to one of the plurality of brake calipers 375, and more specifically, a brake caliper positioned in proximity to the ground brush.

A ventilation flow 397, 399 may be provided internal to the casing 310 to provide a flow path from the gear-train end to the generator end of the WTG. Flow in this direction will limit disc brake wear elements from entering the air gap 395 between the rotor structure 365 and stator structure 315. A ventilation seal 398 internal to the casing 310 may further prevent ventilation flow from forcing disc brake wear elements into the casing internals. The ventilation seal 398 may be mounted on the generator-side wall 370 of the casing and seal against the rotating support ring 345.

Figure 5:
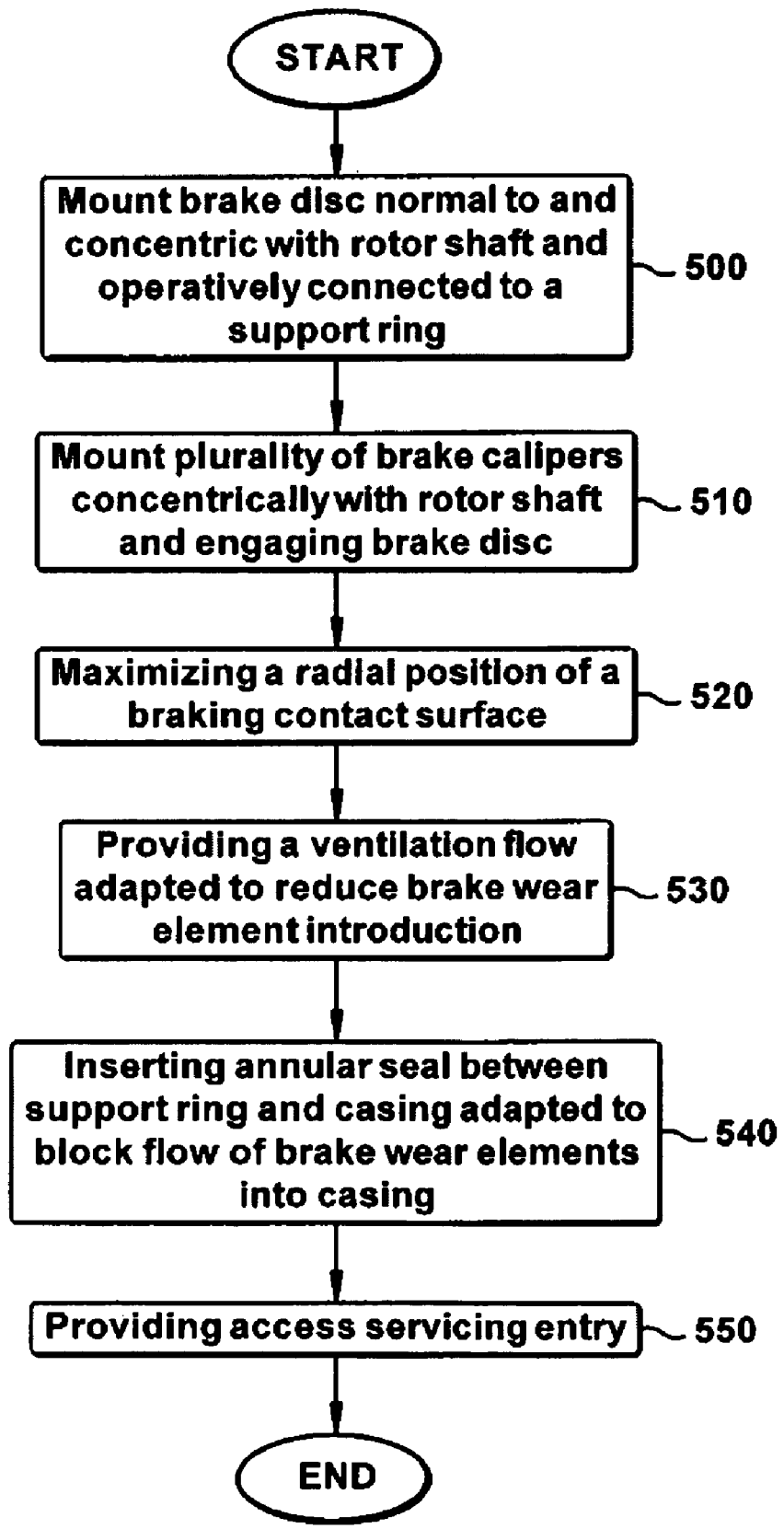
FIG. 5 illustrates a flowchart for a method of braking the wind turbine generator.

A further aspect of the present invention provides a method for braking a wind turbine generator including a rotor shaft supporting a rotor wheel and a support ring for a rotor winding surrounded by a stator winding within a generator casing. FIG. 5 illustrates a flow chart for a method of braking a wind turbine generator. The method includes mounting a brake disc normal to and concentric with the rotor shaft and operatively connecting to the support ring; and mounting a plurality of disc brake calipers arranged concentrically with the rotor shaft and adapted to engage the annular brake disc.

Step 500 provides for mounting a brake disc normal to and concentric with the rotor shaft and operatively connected to the support ring including mounting the brake disc on an inner surface of the support ring in proximity to the generator-side end of the supporting. Step 510 includes mounting a plurality of disc brake calipers arranged concentrically with the rotor shaft and adapted to engage the brake disc. Step 520 includes maximizing a radial position of a braking contact surface between the brake disc and the brake pad of the disc brake caliper. Step 530 includes providing a ventilation flow adapted to avoid blowing brake wear products into the generator internals. Step 540 includes sealing ventilation with an annular seal between the generator casing and the support. Step 550 provides access for servicing a ground brush, which may include providing access through a guard on the generator side end.

In yet another aspect of the present invention, a drum brake arrangement is provided to replace the overhung disc brake of the prior art. FIG. 6A illustrates a cutaway axial view of the inventive arrangement for a drum brake within the wind turbine generator. FIG. 6B illustrates a cross section of the drum brake arrangement.

The structure of the wind turbine generator rotor shaft, rotor disc, support ring wheel, support ring, rotor structure and stator structure remain as previously described. The inner circumferential surface of the support ring will act as the brake lining. The brake fining may be engaged by a plurality of brake shoe sections disposed circumferentially around the inner surface the support ring.

A plurality of support arms 405 may be mounted to generator casing 310. The support arms 405 extend axially in proximity to the casing radially axially inward wall on the generator-side end. The support arms 405 extend axially from the casing to a position corresponding to the inner surface 430 of the support ring 345. A piston mechanism 410 may be pivotally attached to the support arm 405 at pivot point 411. A brake shoe section 420 may also be pivotally attached to the support arm 405 at pivot point 412. The piston mechanism

410 may further engage a connecting point 413 on the brake shoe section 420, which is offset from the brake shoe pivot point 412. As the piston mechanism 410 extends, a braking surface 425 of the brake shoe 420 moves outward radially to engage the inner surface 430 of the support ring 345, which acts as the braking surface.

The ground brush 341 in this arrangement may be provided with an electrically isolated mounting to the support arm 405, for example. A ground wire 342 may be extended to a ground point 343 external the generator casing The drum brake structure described above eliminates the overhung brake disc of the prior art, resulting in less weight and overhang moment. Further, the elimination of the overhung brake disc enhances access to the internals of the generator casing on the generator-side end, providing enhanced access for servicing to the ground brush.

While various embodiments are described herein, it will be appreciated from the specification that various combinations of elements, variations or improvements therein may be made, and are within the scope of the invention.

The invention claimed is:

1. A disc brake arrangement adapted for a wind turbine generator incorporating a rotor shaft supporting a support ring wheel and a support ring for a rotor winding surrounded by a stator winding within a generator casing, comprising:
   a rotor shaft;
   a support ring;
   a brake disc mounted normal to and concentric with the rotor shaft and operatively connected to the support ring; and
   a plurality of disc brake calipers arranged concentrically with the rotor shaft and adapted to engage the brake disc.

2. The disc brake arrangement adapted for a wind turbine generator according to claim 1, wherein the brake disc comprises: an annulus concentric with the rotor shaft.

3. The disc brake arrangement adapted for a wind turbine generator according to claim 1, wherein an outer radial end of the brake disc is operatively connected to the support ring.

4. The disc brake arrangement adapted for a wind turbine generator according to claim 3, wherein the operative connection for the outer radial end of the brake disc connects at an inner annular surface of the support ring.

5. The disc brake arrangement adapted for a wind turbine generator according to claim 4, wherein the operative connection for an outer radial end of the brake disc connects at an axial generator-end side of the support ring.

6. The disc brake arrangement adapted for a wind turbine generator according to claim 3, further comprising: an operative connection between the rotor wheel and the support ring, wherein the operative connection is offset from a center of the support ring and adapted to counterbalance the operative connection of the brake disc to the support ring.

7. The disc brake arrangement adapted for a wind turbine generator according to claim 6, further comprising: a stiffening ring on an axial end of the support ring opposite to an end of the support ring including the brake disc.

8. The disc brake arrangement adapted for a wind turbine generator according to claim 3, wherein a radial position is maximized for a braking surface between the brake disc and brake pads of the disc brake calipers.

9. The disc brake arrangement adapted for a wind turbine generator according to claim 3, wherein the disc brake calipers are operatively mounted internal to casing.

10. The disc brake arrangement adapted for a wind turbine generator according to claim 3, further comprising: axial ventilation flow within the generator casing from a gearbox side to a generator end side.

11. The disc brake arrangement adapted for a wind turbine generator according to claim 3, further comprising: axial ventilation flow within the generator casing from a gearbox side to a generator end side, adapted to prevent disc brake wear elements from flowing past the adapted to preclude ventilation flow past the disc brake.

12. The disc brake arrangement adapted for a wind turbine generator according to claim 11, further comprising: an annular seal concentric with the rotor shaft between the support ring and the casing, adapted to prevent ventilation flow past disc brake wear carrying disc brake wear elements from flowing within the casing.

13. The disc brake arrangement adapted for a wind turbine generator according to claim 3, further comprising: an insulated mounting on the brake caliper for a ground brush of the wind turbine generator.

14. The disc brake arrangement adapted for a wind turbine generator according to claim 13, further comprising an guard mounted on a generator side of the casing and adapted to provide access to at least one of the disc brake caliper and a ground brush for the wind turbine generator.

15. A method for braking a wind turbine generator incorporating a rotor shaft supporting a rotor wheel and support ring for a rotor structure surrounded by a stator structure within a generator frame, the method comprising:
    mounting a brake disc normal to and concentric with the rotor shaft and operatively connecting to the support ring; and
    mounting a plurality of disc brake calipers arranged concentrically with the rotor shaft and adapted to engage the annular brake disc.

16. The method for braking a wind turbine generator according to claim 15, the step of mounting a disc brake further comprising:
    mounting the brake disc on an inner surface of the support ring.

17. The method for braking a wind turbine generator according to claim 16, the step of mounting a disc brake further comprising:
    mounting the brake disc an axial location at the generator-side end of the support ring.

18. The method for braking a wind turbine generator according to claim 17, the step of mounting a disc brake further comprising:
    a braking contact surface between the brake disc and the brake pad of the brake caliper wherein a radial position of the braking contact surface is maximized.

19. The method for braking a wind turbine generator according to claim 17, further comprising: providing a ventilation flow adapted to avoid blowing brake wear products into the generator internals.

20. The method for braking a wind turbine generator according to claim 19, further comprising: sealing ventilation with an annular seal between the generator casing and the support ring.

* * * * *